(12) United States Patent
Spenninger

(10) Patent No.: US 11,999,049 B2
(45) Date of Patent: Jun. 4, 2024

(54) TACTILE FEEDBACK OF AN END EFFECTOR OF A ROBOT MANIPULATOR OVER DIFFERENT ORIENTATION RANGES

(71) Applicant: Franka Emika GmbH, Munich (DE)

(72) Inventor: Andreas Spenninger, Karlsfeld (DE)

(73) Assignee: Franka Emika GmbH, Munich (DE)

( * ) Notice: Subject to any disclaimer, the term of this patent is extended or adjusted under 35 U.S.C. 154(b) by 75 days.

(21) Appl. No.: 17/624,013

(22) PCT Filed: Jul. 3, 2020

(86) PCT No.: PCT/EP2020/068784
§ 371 (c)(1),
(2) Date: Dec. 30, 2021

(87) PCT Pub. No.: WO2021/004920
PCT Pub. Date: Jan. 14, 2021

(65) Prior Publication Data
US 2022/0347866 A1    Nov. 3, 2022

(30) Foreign Application Priority Data
Jul. 5, 2019  (DE) ...................... 10 2019 118 260.3

(51) Int. Cl.
*B25J 9/16*         (2006.01)
*B25J 13/02*        (2006.01)

(52) U.S. Cl.
CPC ........... *B25J 13/025* (2013.01); *B25J 9/1638* (2013.01)

(58) Field of Classification Search
CPC ............. A61B 34/76; A61B 2017/2927; B25J 9/1633; B25J 9/1653; B25J 9/1638;
(Continued)

(56) References Cited

U.S. PATENT DOCUMENTS 9,592,608 B1   3/2017  Bingham et al.
10,576,629 B2  3/2020  Rohmer et al.
(Continued)

FOREIGN PATENT DOCUMENTS

DE   102013218823 A1   4/2015
DE   102014216514 B3   9/2015
(Continued)

OTHER PUBLICATIONS

English translation of International Preliminary Report on Patentability issued in International Application No. PCT/EP2020/068784 on Jan. 20, 2022.

*Primary Examiner* — Abby Y Lin
*Assistant Examiner* — Dylan M Katz
(74) *Attorney, Agent, or Firm* — Hoffmann & Baron, LLP

(57) ABSTRACT

A method includes: controlling actuators of a robot manipulator to compensate for influence of gravity; during a manual guidance of the robot manipulator detecting an orientation of an end effector; and controlling at least part of the actuators in such a way that during manual guidance of the end effector, the end effector: within a first range of a first rotation, opposes no or a speed-dependent resistance and outside the first range opposes a rotation angle-dependent resistance to the manual guidance, wherein the first rotation is a rotation angle of the end effector about its longitudinal axis; and within a second range of the second rotation, opposes no or a speed-dependent resistance to the manual guidance, and outside the second range, opposes a deflection-dependent resistance to the manual guidance, wherein the second rotation is a rotational deflection of the end effector from its original longitudinal axis or a vertical axis.

18 Claims, 1 Drawing Sheet

(58) Field of Classification Search
CPC ...... B25J 9/1607; B25J 9/1643; B25J 13/025; B25J 9/0081; B25J 9/1602; B25J 9/1694; B25J 19/0004; G05B 2219/39183; G05B 2219/36432; G05B 2219/39325; G05B 2219/39346; G05B 2219/40527; G05B 19/42

See application file for complete search history.

(56) References Cited

U.S. PATENT DOCUMENTS

| | | | |
|---|---|---|---|
| 11,478,934 B2* | 10/2022 | Sato | B25J 19/063 |
| 2006/0142657 A1* | 6/2006 | Quaid | A61B 90/37 |
| | | | 600/424 |
| 2015/0081098 A1 | 3/2015 | Kogan | |
| 2016/0052128 A1 | 2/2016 | Zimmermann et al. | |
| 2016/0129588 A1 | 5/2016 | Pfaff | |
| 2016/0375588 A1 | 12/2016 | Ueberle et al. | |
| 2017/0014997 A1* | 1/2017 | Rohmer | B25J 9/1676 |
| 2019/0168383 A1 | 6/2019 | Haddadin | |

FOREIGN PATENT DOCUMENTS

| | | | |
|---|---|---|---|
| DE | 102014222809 B3 | | 1/2016 |
| DE | 102015009048 B3 | | 8/2016 |
| DE | 102015008144 A1 | | 12/2016 |
| DE | 102016004841 A1 | | 10/2017 |
| JP | 2011206886 A | * | 10/2011 |
| WO | WO 2014/043702 A1 | | 3/2014 |

* cited by examiner

TACTILE FEEDBACK OF AN END EFFECTOR OF A ROBOT MANIPULATOR OVER DIFFERENT ORIENTATION RANGES

CROSS-REFERENCE TO RELATED APPLICATIONS

The present application is the U.S. National Phase of PCT/EP2020/068784, filed on 3 Jul. 2020, which claims priority to German Patent Application No. 10 2019 118 260.3, filed on 5 Jul. 2019, the entire contents of which are incorporated herein by reference.

BACKGROUND

Field

The invention relates to a method for controlling a robot manipulator during manual guidance of the robot manipulator by a user, and to a robot manipulator including a control unit implemented together with further elements of the robot manipulator for carrying out said method.

Related Art

The following information is not necessarily derived from prior art, but represents general thoughts and considerations:

When manually guiding a robot manipulator, it may become necessary to limit an orientation of an end effector of the robot manipulator. If, for example, mechanical brakes are activated when a predefined range is exceeded, the movement of the robot manipulator is interrupted in a way that is not very intuitive for the user, so that manual guidance can only be continued after the mechanical brakes have been released.

SUMMARY

It is therefore an object of the invention to improve the manual guidance of a robot manipulator by a user, taking into account ranges or limits in the orientation of the end effector of the robot manipulator.

The invention results from the features of the independent claims. Advantageous further developments and embodiments are the subject of the dependent claims.

A first aspect of the invention relates to a method of controlling a robot manipulator while a user is manually guiding the robot manipulator. The robot manipulator has a plurality of members interconnected by joints, and an end effector connected to a distal member by another joint. Actuators are located at all joints. The method includes:

Control of the actuators to compensate for a gravitational force acting on the robot manipulator by a control unit, so that the robot manipulator, starting from a stationary pose, remains in the stationary pose without acceleration without application of an external force, but that the robot manipulator is guidable manually;

During manual guidance: Detection of an orientation of the end effector with respect to the distal member or with respect to an earth-fixed coordinate system by a position angle detecting unit; and Control of at least part of the actuators of the robot manipulator by the control unit based on detected orientation of the end effector in such a way that, during the manual guidance of the end effector, the end effector:

a) within a first range of a first end effector rotation, opposes no or a speed-dependent resistance to the manual guidance, and outside the first range, opposes a rotation angle-dependent resistance to the manual guidance, wherein the first end effector rotation is a rotation angle of the end effector about a longitudinal axis of the end effector, and b) within a second range of a second end effector rotation, opposes no or the speed-dependent resistance to the manual guidance, and outside the second range, opposes a deflection-dependent resistance to the manual guidance, wherein the second end effector rotation is a rotational deflection of the end effector from its originally aligned longitudinal axis or a vertical axis.

When manually guiding a robot manipulator, a user of the robot manipulator applies an external force to the robot manipulator, in particular, by hand force. In this regard, the first aspect of the invention particularly relates to the case where the user changes the orientation of an end effector of the robot manipulator by manually guiding it. The end effector of the robot manipulator is located at the distal member of the robot manipulator, that is, at the free end of the robot manipulator, that is, the end of the robot manipulator opposite to the base of the robot manipulator. The end effector is the element of the robot manipulator that comes into contact with a workpiece or with another object from the environment of the robot manipulator.

In particular, the robot manipulator is an industrial robot that has multiple degrees of freedom, especially with respect to the end effector with respect to an invented coordinate system, due to multiple joints connecting the various members of the robot manipulator. The end effector is movably connected to the distal member by at least one further joint, wherein the end effector is referred to as that end of the robot manipulator which is the last to be connected to the rest of the manipulator arm by a joint and, in particular, also by a corresponding actuator at that joint. Thus, in particular, all joints of the robot manipulator have actuators that can be controlled by the control unit to generate a torque or a force respectively between two members of the robot manipulator or between the distal member of the robot manipulator and the end effector.

When the actuators for compensating for a gravitational force acting on the robot manipulator are controlled by the control unit, the actuators of the robot manipulator are controlled in such a way that in the case where no external force is applied to the robot manipulator, in particular by the user, apart from the gravitational force, the robot manipulator does not move from a stationary pose. This is achieved, in particular, via a geometric model and a model of a mass distribution over the robot manipulator, which determines the current torques on the joints of the robot manipulator depending on currently detected joint angles or an otherwise detected pose of the robot manipulator, so that the influence of gravity is known and therefore it is also known which counter-torque is to be set on the actuators of the robot manipulator, so that the robot manipulator does not move influenced by gravity. The robot manipulator is therefore artificially placed in weightlessness, so to speak, wherein in particular admittance control is active, so that the robot manipulator can continue to be moved by the user, in particular manually, in particular, in order to teach positions and orientations to the robot manipulator and, in particular, to the end effector of the robot manipulator.

In particular, the position angle detection unit includes the entirety of all joint angle sensors, including the joint between the distal member and the end effector. In particular, the joint angle sensors are used to detect an angle between two respective members of the robot manipulator, so that at least a relative orientation of the end effector with respect to the distal member of the robot manipulator is known, but preferably, in addition to the relative orientation, an orientation of the end effector with respect to an earth-fixed coordinate system is also known. For the execution of the method, it is irrelevant in which coordinate system the deflection or the angle of rotation are notated; because the notation of these quantities does not change the reference of these quantities. Furthermore, known angle systems can be used, in particular, cardan angles, Euler angles or, to avoid singularities, quaternions.

In particular, a longitudinal axis of the end effector lies on a straight line defining the members of the robot manipulator when all the members and the end effector of the robot manipulator are maximally elongated, and in particular are each aligned 180° with respect to each other. Furthermore, the longitudinal axis of the end effector corresponds to the axis of rotation of the drill, for example, when a drill is used on the end effector. Further, the longitudinal axis of the end effector may be defined by an imaginary line connecting a distal tip of the end effector to the joint connecting the end effector to the distal member.

A velocity-dependent resistance is typically also referred to as damping. In the first range, when the end effector is rotated by the user around its longitudinal axis, the user feels a velocity-dependent resistance force, whereas in the second range the user feels a deflection-dependent resistance. Preferably, the ranges are defined over a zero position of the end effector, wherein the zero position of the end effector is preferably predetermined with respect to the distal member of the robot manipulator or with respect to a direction defined in an earth-fixed global coordinate system.

Similarly, the second range is preferably defined relative to a zero position of the end effector, wherein the zero position of the end effector is defined by the current orientation of its body-fixed longitudinal axis relative to the original orientation of its longitudinal axis from which the end effector is deflected. In this case, the original orientation of the longitudinal axis of the end effector is that which coincides with the body-fixed longitudinal axis of the end effector in a neutral position, in particular, a middle position, in particular, aligned with a straight line defined by the links, which occurs when all the members are maximally stretched from one another, in particular, at an angle of 180°.

Accordingly, outside of the second range relative to the original orientation of the longitudinal axis of the end effector, a deflection-dependent resistance is applied to the manual guidance. The deflection of the end effector in this case consists of a body-fixed point of the end effector, or an imaginary point outside the end effector but stationary relative to the end effector, remaining relative to the original orientation of the longitudinal axis when deflected, but the longitudinal axis of the end effector tilting in the radial direction away from the original orientation of the longitudinal axis. In the two-dimensional case, the second end-effector rotation therefore corresponds to a movement within an imaginary triangle; in the three-dimensional case, the second end-effector rotation therefore corresponds to a movement within an imaginary cone. The second end-effector rotation is, in a first alternative, a rotational deflection of the end effector from its original longitudinal axis orientation, and in a second alternative, the deflection from a vertical axis. In contrast to the original orientation of the longitudinal axis of the end effector, a vertical axis is defined relative to the earth and describes a vertical axis in an earth-fixed coordinate system, in the direction of which gravity acts.

It is an advantageous effect of the invention that when manually guiding the robot manipulator, the robot manipulator and, in particular, the end effector of the robot manipulator provide intuitive feedback on the current orientation of the end effector. In particular, specified boundaries are softly implemented so that the user receives tactile feedback with smooth transitions and immediately understandable stimuli when guiding the end effector. In particular, if the end effector is deflected beyond the boundary of the first range or the second range and experiences an artificial spring force there, the result is that when the end effector is released outside the first range or outside the second range, the end effector strives back to its original position, absorbs kinetic energy in the process, and is slowed down by the artificial damping when it enters the first range or the second range and returns to its original position with a delay.

According to an advantageous embodiment, the second end effector rotation is a rotational deflection of the end effector from the original longitudinal axis or a vertical axis in a predetermined plane. In this case, according to the idea of the first aspect of the invention, the deflection takes place in a plane, and it may be open what reaction the end effector performs with respect to a change of orientation of the end effector by manual guidance in the other directions away from the original orientation of the longitudinal axis, that is, outside the predetermined plane.

According to another advantageous embodiment, the predetermined plane is a vertical plane and the second end-effector rotation is defined about a horizontal axis, wherein the horizontal axis maintains its orientation with respect to the earth-fixed environment of the robot manipulator even when the robot manipulator is rotated about a vertical axis. In particular, if the predetermined plane is a directionally fixed vertical plane that translates with the end effector but its orientation is invariant with respect to an earth-fixed coordinate system, the behavior of the first aspect of the invention in this plane can always be guaranteed with respect to a particular direction in an earth-fixed coordinate system, wherein for other directions any options of the reaction of the end effector are open, in particular, a blocking with respect to a rotational deflection of the end effector with respect to its original aligned longitudinal axis.

According to another advantageous embodiment, the second end effector rotation is a rotational deflection of the end effector from the original longitudinal axis or a vertical axis in any deflection directions with a common center of rotation. According to this embodiment, the result is an imaginary cone that spans the first range. In this case, the rotational deflection occurs relative to the originally aligned longitudinal axis in any direction away from it, but with a common point of rotation of all deflections on the originally aligned longitudinal axis, which corresponds to an axis of rotational symmetry of the cone. Alternatively, the axis of rotational symmetry of the cone corresponds to a vertical axis, where the vertical axis coincides with a direction of gravity. In both cases, the advantage is that the rotational deflection of the end effector shows symmetrical behavior with respect to an infinite variety of directions.

According to a further advantageous embodiment, the control of at least part of the actuators of the robot manipulator is performed in such a way that, during manual guidance of the end effector, the end effector outside the first range and/or outside the second range opposes the manual guidance with a speed-dependent resistance.

According to this embodiment, when manually guided by a user, the end effector experiences a velocity-dependent resistance in addition to the deflection-dependent or rotation angle-dependent resistance of the end effector against a movement of the user, so that an artificial spring and an artificial damper act outside the first range and the second range, respectively, which are usually implemented in combination with a PD controller.

According to a further advantageous embodiment, the deflection-dependent resistance outside the second range is nonlinear to the deflection and/or the rotation angle-dependent resistance outside the first range is nonlinear to the rotation angle. Due to the nonlinear relationship between deflection or angle of rotation and the respective resistance, it is advantageously easier to implement specified limits, especially if the mapping from the angle of rotation or deflection to the respective resistance delivers disproportionately higher values with increasing deflection or increasing angle of rotation.

According to a further advantageous embodiment, a respective nonlinear function between deflection and resistance and/or between rotation angle and resistance is one of each of the following:
sigmoid function,
polynomial function,
trigonometric function,
exponential function, and
logarithmic function.

According to a further advantageous embodiment, the deflection-dependent resistance and/or the rotation angle-dependent resistance each saturate at a predetermined upper limit. The upper limit not exceeded by the end effector with respect to the respective associated actuator torque is advantageously exactly or slightly below the natural upper limit of the actuators of the robot manipulator or at least of the actuator arranged at the joint between the end effector and the distal member, wherein a natural upper limit is, for example, a maximum permissible torque on a gear of the respective actuator or the maximum torque that can be applied by an actuator. Advantageously, this prevents overloading of the robot manipulator, in particular, of a gearbox or an actuator or a structural component of the robot manipulator.

According to a further advantageous embodiment, the control of the at least one part of the actuators of the robot manipulator by the control unit is performed in such a way that during manual guidance of the end effector, the end effector within the second range of the second end effector rotation opposes to the manual guidance a deflection-dependent resistance, wherein the deflection-dependent resistance within the second range is smaller than half of the deflection-dependent resistance outside the second range per deflection. The artificial spring within the second range in combination with the artificial damping according to the first aspect of the invention results in an artificial mass-spring-damper system that provides a very intuitive behavior while allowing the end effector to return to its rest position, that is, initial position and initial orientation, when the end effector is released.

According to a further advantageous embodiment, the control of the at least one part of the actuators of the robot manipulator by the control unit is performed in such a way that, during manual guidance of the end effector, the end effector within the first range of the first end effector rotation opposes to the manual guidance a rotational angle-dependent resistance, wherein the rotational angle-dependent resistance within the first range is smaller than half of the deflection-dependent resistance outside the first range per deflection. The artificial spring within the second range in combination with the artificial damping according to the first aspect of the invention results in an artificial mass-spring-damper system that provides a very intuitive behavior while allowing the end effector to return to its rest position, that is, initial position and initial orientation, when the end effector is released.

Another aspect of the invention relates to a robot manipulator including a plurality of members interconnected by joints, wherein an end effector is connected to the distal member by a further joint, and actuators are arranged at all joints, further including: a position angle detection unit configured to detect, during manual guidance, an orientation of the end effector with respect to the distal member or with respect to an earth-fixed coordinate system; and a control unit configured to control the actuators to compensate for a gravitational force acting on the robot manipulator such that the robot manipulator, starting from a stationary pose, remains in the stationary pose without acceleration and without the application of external force, but that the robot manipulator is guidable manually, the control unit further configured to control at least a part of the actuators of the robot manipulator based on detected orientation of the end effector in such a way that during the manual guidance of the end effector, the end effector:

a) within a first range of a first end effector rotation, opposes no or a speed-dependent resistance to the manual guidance, and outside the first range, opposes a rotation angle-dependent resistance to the manual guidance, wherein the first end effector rotation is a rotation angle of the end effector about a longitudinal axis of the end effector; and b) within a second range of a second end effector rotation, opposes no or the speed-dependent resistance to the manual guidance, and outside the second range, opposes a deflection-dependent resistance to the manual guidance, wherein the second end effector rotation is a rotational deflection of the end effector from its originally aligned longitudinal axis or a vertical axis.

Advantages and preferred developments of the proposed robot manipulator result from an analogous and sensible transfer of the explanations given above in connection with the proposed method.

Further advantages, features and details result from the following description, in which—possibly with reference to the drawings—at least one embodiment example is described in detail. Identical, similar, and/or functionally identical parts are provided with the same reference numerals.

The representations in the figures are schematic and not to scale.

DETAILED DESCRIPTION

Figure 1:
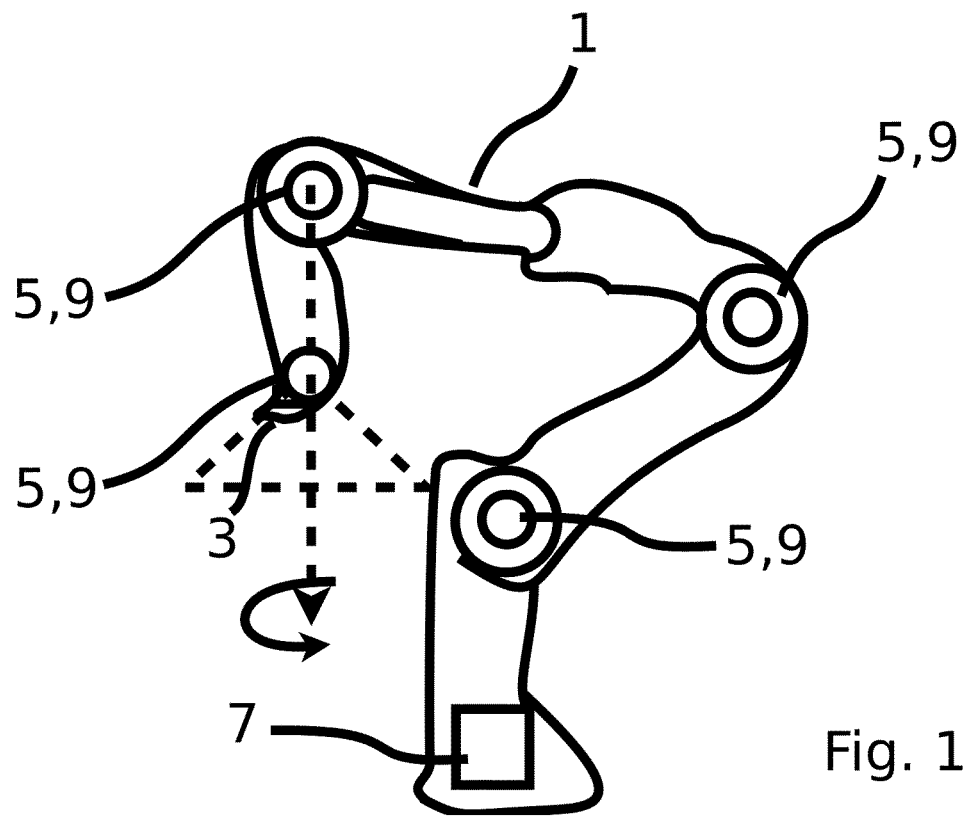
FIG. 1 shows a robot manipulator with a control unit for carrying out a method according to an embodiment of the invention as shown in FIG. 2.

FIG. 1 shows a robot manipulator 1 having a plurality of members interconnected by joints. An end effector 3 is connected to the distal member via another joint. Actuators 5 are located at all joints, including the one connecting the distal member to the end effector 3. A control unit 7 is connected to the robot manipulator 1, which is used to control the actuators 5 based in particular on the joint angles detected by a position angle detection unit 9. The position angle detection unit 9 is formed by the entirety of the angle sensors, with at least one angle sensor located at each joint. The control unit 7 is used to execute the method shown in FIG. 2 by controlling at least part of the actuators 5. For this purpose, the control unit 7 controls the actuators 5 for compensating a gravitational force acting on the robot manipulator 1 in such a way that the robot manipulator 1, starting from a stationary pose, remains in the stationary pose without acceleration but can be guided manually without the application of external force. The position angle detection unit 9 determines an orientation of the end effector 3 with respect to an earth-fixed coordinate system during the manual guidance. Based on the detected orientation of the end effector 3, the control unit 7 further controls at least part of the actuators 5 of the robot manipulator 1 such that during manual guidance of the end effector 3, the end effector 3:

a) opposes no resistance or a speed-dependent resistance to manual guidance within a first range of a first end effector rotation, and opposes a rotation angle-dependent resistance to manual guidance outside the first range, wherein the first end effector rotation is a rotation of the end effector 3 about a longitudinal axis of the end effector 3, and b) within a second range of a second end effector rotation, opposes no or a speed-dependent resistance to manual guidance, and outside the second range, opposes a deflection-dependent resistance to manual guidance, wherein the second end effector rotation is a rotational deflection of the end effector 3 from a vertical axis in arbitrary deflection directions, wherein all deflections have a common center of rotation on the originally aligned longitudinal axis of the end effector 3. The angle-dependent deflection is symbolized by a curved arrow in FIG. 1, and the resulting cone about a vertical axis is symbolized by a dashed triangle in FIG. 1.

Figure 2:
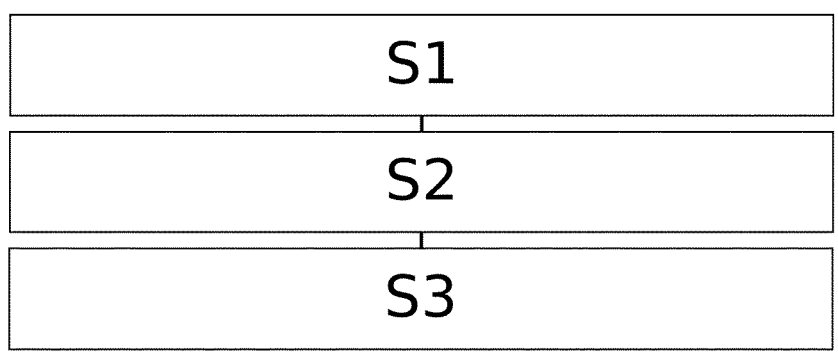
FIG. 2 shows the method for controlling a robot manipulator during manual guidance according to the first embodiment of the invention.

FIG. 2 shows a method for controlling a robot manipulator 1 while a user is manually guiding the robot manipulator 1. The method is carried out on a robot manipulator 1 as shown in FIG. 1. The robot manipulator 1 has a plurality of members interconnected by joints, and an end effector 3 is connected to the distal member by another joint, wherein actuators 5 are disposed at all joints. The method has the following steps:

Control S1 of the actuators 5 to compensate for a gravitational force acting on the robot manipulator 1 by a control unit 7, so that the robot manipulator 1, starting from a stationary pose, remains in the stationary pose without acceleration but can be guided manually without the application of external force, During manual guidance: Detection S2 of an orientation of the end effector 3 with respect to the distal member or with respect to an earth-fixed coordinate system by a position angle detecting unit 9, and Control S3 of at least part of the actuators 5 of the robot manipulator 1 by the control unit 7 in such a way that, during manual guidance of the end effector 3, the end effector 3:

a) within a first range of a first end effector rotation, opposes no resistance or a speed-dependent resistance to manual guidance, and outside the first range, opposes a rotation angle-dependent resistance to manual guidance, wherein the first end effector rotation is a rotation of the end effector 3 about a longitudinal axis of the end effector 3, and b) within a second range of a second end effector rotation, opposes no resistance or a speed-dependent resistance to manual guidance, and outside the second range, opposes a deflection-dependent resistance to manual guidance, wherein the second end effector rotation is a rotational deflection of the end effector 3 from its originally aligned longitudinal axis or a vertical axis.

Although the invention has been further illustrated and explained in detail by example embodiments, the invention is not limited by the disclosed examples and other variations may be derived therefrom by a person skilled in the art without departing from the scope of protection of the invention. It is therefore clear that a wide range of variations exists. It is also clear that example embodiments are really only examples which are not to be understood in any way as limiting, for example, the scope of protection, the possibilities of use or the configuration of the invention. Rather, the preceding specification and the figure description enable the person skilled in the art to implement the example embodiments in a concrete manner, wherein the person skilled in the art, being aware of the disclosed inventive idea, can make a variety of changes, for example with respect to the function or the arrangement of individual elements mentioned in an example embodiment, without leaving the scope of protection defined by the claims and their legal equivalents, such as further explanations in the specification.

LIST OF REFERENCE NUMERALS

1 Robot manipulator
3 End effector
5 Actuators
7 Control unit
9 Position angle detection unit
S1 Control
S2 Detection
S3 Control

The invention claimed is:

1. A method of controlling a robot manipulator during manual guidance of the robot manipulator by a user, wherein the robot manipulator comprises a plurality of members interconnected by joints and an end effector connected to a distal member by a further joint, and wherein actuators are arranged at all joints, the method comprising:
   controlling the actuators to compensate for a gravitational force acting on the robot manipulator by a control unit, so that the robot manipulator, starting from a stationary pose, remains in the stationary pose without acceleration without application of external force, but that the robot manipulator is guidable manually;
   during the manual guidance of the robot manipulator by the user:
      detecting an orientation of the end effector with respect to the distal member or with respect to an earth-fixed coordinate system by an angle detecting unit; and
      controlling at least part of the actuators of the robot manipulator by the control unit based on the orientation of the end effector detected by the angle detection unit in such a way that, during the manual guidance of the end effector, the end effector:
         within a first range of a first rotation of the end effector, experiences damping by a speed-dependent resistance to the manual guidance, and outside the first range, experiences springing by a rotation angle-dependent resistance to the manual guidance, wherein the first rotation is a rotation angle of the end effector about a longitudinal axis of the end effector, and within a second range of a second rotation of the end effector, experiences damping by the speed-dependent resistance to the manual guidance, and outside the second range, experiences springing by a deflection-dependent resistance to the manual guidance, wherein the second rotation is a rotational deflection of the end effector from its originally aligned longitudinal axis or a vertical axis of the earth-fixed coordinate system.

2. The method according to claim 1, wherein the second rotation is a rotational deflection of the end effector from an original longitudinal axis or the vertical axis in a predetermined plane.

3. The method according to claim 2, wherein the predetermined plane is a vertical plane and the second rotation is defined about a horizontal axis of the earth-fixed coordinate system wherein the horizontal axis maintains its orientation with respect to an earth-fixed environment of the robot manipulator even when the robot manipulator is rotated about the vertical axis.

4. The method according to claim 1, wherein the second rotation is a rotational deflection of the end effector from an original longitudinal axis or the vertical axis in deflection directions having a common center of rotation.

5. The method according to claim 1, wherein controlling the at least part of the actuators of the robot manipulator takes place in such a way that, during the manual guidance of the end effector, the end effector outside the first range and/or outside the second range additionally experiences damping by the speed-dependent resistance to the manual guidance.

6. The method according to claim 1, wherein the deflection-dependent resistance outside the second range is nonlinear to the rotational deflection and/or the rotation angle-dependent resistance outside the first range is nonlinear to the rotation angle.

7. The method according to claim 6, wherein a respective nonlinear function between rotational deflection and resistance and/or between rotation angle and resistance is one of the following:
sigmoid function;
polynomial function;
trigonometric function;
exponential function; and
logarithmic function.

8. The method according to claim 1, wherein each of the deflection-dependent resistance and/or each of the rotation angle-dependent resistance saturates at a predetermined upper limit.

9. The method according to claim 1, wherein controlling the at least part of the actuators of the robot manipulator by the control unit takes place in such a way that during the manual guidance of the end effector, the end effector within the second range of the second rotation additionally experiences springing by the deflection-dependent resistance to the manual guidance, wherein the deflection-dependent resistance within the second range is smaller than half the deflection-dependent resistance outside the second range per deflection.

10. A robot manipulator controllable during manual guidance by a user, wherein the robot manipulator comprises a plurality of members interconnected by joints and an end effector connected to a distal member by a further joint, and wherein actuators are arranged at all joints, the robot manipulator further comprising:

an angle detection unit configured to detect an orientation of the end effector with respect to the distal member or with respect to an earth-fixed coordinate system during the manual guidance of the robot manipulator by the user, and a control unit configured to control the actuators to compensate for a gravitational force acting on the robot manipulator such that the robot manipulator, starting from a stationary pose, remains in the stationary pose without acceleration without the application of external force, but that the robot manipulator is guidable manually, the control unit further configured to control at least part of the actuators of the robot manipulator, during the manual guidance of the robot manipulator by the user, based on the orientation of the end effector detected by the angle detection unit in such a way that during the manual guidance of the end effector, the end effector:

within a first range of a first rotation of the end effector, experiences damping by a speed-dependent resistance to the manual guidance, and outside the first range, experiences springing by a rotation angle-dependent resistance to the manual guidance, wherein the first rotation is a rotation angle of the end effector about a longitudinal axis of the end effector, and within a second range of a second rotation of the end effector, experiences damping by the speed-dependent resistance to the manual guidance, and outside the second range, experiences springing by a deflection-dependent resistance to the manual guidance, wherein the second rotation is a rotational deflection of the end effector from its originally aligned longitudinal axis or a vertical axis of the earth-fixed coordinate system.

11. The robot manipulator according to claim 10, wherein the second rotation is a rotational deflection of the end effector from an original longitudinal axis or the vertical axis in a predetermined plane.

12. The robot manipulator according to claim 11, wherein the predetermined plane is a vertical plane and the second rotation is defined about a horizontal axis of the earth-fixed coordinate system, wherein the horizontal axis maintains its orientation with respect to an earth-fixed environment of the robot manipulator even when the robot manipulator is rotated about the vertical axis.

13. The robot manipulator according to claim 10, wherein the second rotation is a rotational deflection of the end effector from an original longitudinal axis or the vertical axis in deflection directions having a common center of rotation.

14. The robot manipulator according to claim 10, wherein control of the at least part of the actuators of the robot manipulator takes place in such a way that, during the manual guidance of the end effector, the end effector outside the first range and/or outside the second range additionally experiences damping by the speed-dependent resistance to the manual guidance.

15. The robot manipulator according to claim 10, wherein the deflection-dependent resistance outside the second range is nonlinear to the rotational deflection and/or the rotation angle-dependent resistance outside the first range is nonlinear to the rotation angle.

16. The robot manipulator according to claim 15, wherein a respective nonlinear function between rotational deflection and resistance and/or between rotation angle and resistance is one of the following:
- sigmoid function;
- polynomial function;
- trigonometric function;
- exponential function; and
- logarithmic function.

17. The robot manipulator according to claim 10, wherein each of each of the deflection-dependent resistance and/or each of the rotation angle-dependent resistance saturates at a predetermined upper limit.

18. The robot manipulator according to claim 10, wherein control of the at least part of the actuators of the robot manipulator by the control unit takes place in such a way that during the manual guidance of the end effector, the end effector within the second range of the second rotation additionally experiences springing by the deflection-dependent resistance to the manual guidance, wherein the deflection-dependent resistance within the second range is smaller than half the deflection-dependent resistance outside the second range per deflection.

* * * * *